US009223705B2

United States Patent
Jayaseelan et al.

(10) Patent No.: US 9,223,705 B2
(45) Date of Patent: Dec. 29, 2015

(54) CACHE ACCESS ARBITRATION FOR PREFETCH REQUESTS

(71) Applicant: Advanced Micro Devices, Inc., Sunnyvale, CA (US)

(72) Inventors: Ramkumar Jayaseelan, Austin, TX (US); John Kalamatianos, Arlington, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 276 days.

(21) Appl. No.: 13/854,541

(22) Filed: Apr. 1, 2013

(65) Prior Publication Data

US 2014/0297965 A1     Oct. 2, 2014

(51) Int. Cl.
| | |
|---|---|
| *G06F 12/08* | (2006.01) |
| *G06F 9/30* | (2006.01) |
| *G06F 12/02* | (2006.01) |
| *G06F 9/52* | (2006.01) |
| *G06F 11/36* | (2006.01) |

(52) U.S. Cl.
CPC ........ *G06F 12/0862* (2013.01); *G06F 9/30047* (2013.01); *G06F 9/528* (2013.01); *G06F 11/366* (2013.01); *G06F 12/0215* (2013.01); *G06F 12/0891* (2013.01)

(58) Field of Classification Search
CPC ............ G06F 12/0862; G06F 12/0215; G06F 12/0891; G06F 9/30047; G06F 9/528; G06F 11/366
See application file for complete search history.

(56) References Cited

U.S. PATENT DOCUMENTS

| | | | | |
|---|---|---|---|---|
| 6,134,633 | A * | 10/2000 | Jacobs ........................... | 711/137 |
| 6,704,860 | B1 * | 3/2004 | Moore ........................... | 712/237 |
| 2003/0105937 | A1 * | 6/2003 | Cooksey et al. ............... | 711/203 |
| 2005/0102474 | A1 * | 5/2005 | Lakshmanamurthy et al. ............................. | 711/125 |
| 2007/0005934 | A1 * | 1/2007 | Rotithor et al. ............... | 711/213 |
| 2009/0070524 | A1 * | 3/2009 | Wood et al. ................... | 711/105 |
| 2010/0199010 | A1 * | 8/2010 | Goren et al. .................. | 710/244 |

* cited by examiner

*Primary Examiner* — Hiep Nguyen (57) ABSTRACT

A processor employs a prefetch prediction module that predicts, for each prefetch request, whether the prefetch request is likely to be satisfied from ("hit") the cache. The arbitration priority of prefetch requests that are predicted to hit the cache is reduced relative to demand requests or other prefetch requests that are predicted to miss in the cache. Accordingly, an arbiter for the cache is less likely to select prefetch requests that hit the cache, thereby improving processor throughput.

20 Claims, 4 Drawing Sheets

CACHE ACCESS ARBITRATION FOR PREFETCH REQUESTS

FIELD OF THE DISCLOSURE

The present disclosure relates generally to processors and more particularly to processor caches.

BACKGROUND

A processor typically employs a cache to store data that is expected to be accessed by an instruction pipeline in the near future. As the processor executes program threads, the entries of the cache are filled from other levels of a memory hierarchy responsive to memory access requests. The memory access requests can be either of two different types: demand requests, representing requests for data (e.g. instructions) known to be needed by an executing program thread, and prefetch requests, representing requests for data that is predicted by a prefetcher to be needed by the executing program thread in the near future. The memory access requests are sent to a cache controller, which determines whether each memory access request can be satisfied at the cache, or must be satisfied from another level of a memory hierarchy, resulting in an entry of the cache being filled with the requested data.

In some processors, multiple demand and prefetch requests can concurrently be available to be sent to the cache controller for processing. However, the cache typically has a limited number of ports to receive memory access requests, such that the cache controller cannot concurrently service all of the pending demand and prefetch requests. Therefore, a processor can employ an arbiter that controls which memory access request is provided to each port of the cache controller during each access cycle. The arbiter typically employs a simple arbitration scheme to select among the pending memory access requests, such as a round-robin scheme whereby a memory access request for a different executing program thread is provided to the cache each access cycle. However, such arbitration schemes may not make efficient use of the cache, reducing instruction throughput and consuming unnecessary power.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-6 illustrate example techniques for arbitrating between pending memory access requests targeted to a processor cache. The processor employs a prefetch prediction module that predicts, for each prefetch request, whether the prefetch request is likely to be satisfied from ("hit") the cache. The arbitration priority of prefetch requests that are predicted to hit the cache is reduced relative to demand requests or other prefetch requests that are predicted to miss in the cache. Accordingly an arbiter for the cache is less likely to select prefetch requests that hit the cache, thereby improving processor throughput.

To illustrate, when the arbiter provides a prefetch request that hits in the cache (referred to for purposes of description as a "prefetch hit") the latency for subsequent demand requests that target the same data as the prefetch hit is not reduced, because that data is already present at the cache. However, each prefetch hit consumes time and energy at the cache as the cache controller must decode the address for the prefetch hit, compare the decoded address to tag and other information to determine that the data for the prefetch hit is already stored in the cache, and the like. During the time that the cache is processing the prefetch hit, it is not available to service other pending memory access requests, including demand requests and prefetch requests that would miss in the cache (referred to for purposes of description as "prefetch misses"). Thus, each prefetch hit increases the latency of the pending demand requests and the subsequent demand requests that would benefit from more rapid satisfaction of pending prefetch misses, without decreasing the latency of any subsequent demand request. Each prefetch hit therefore has a net negative impact on processor throughput. Accordingly, by de-prioritizing prefetch hits relative to pending demand requests and prefetch misses, the processor can increase processor throughput.

In some embodiments, the prefetch prediction module includes a table of address tag information, referred to as prefetch tags, for the data stored at the entries of the cache. The prefetch tags can be a transformation ("hash") of the tag information used to access the cache itself, and can be updated by the cache controller as cache entries are evicted and filled with new data. For each prefetch request, the address information for the request is hashed, and the resulting value compared to the table of prefetch tags, whereby a match indicates the prefetch request is predicted to hit in the cache (i.e. is predicted to be a prefetch hit). In some embodiments, the hash of the address information and the hash of the tag information is a more simplified representation of the address decoding that takes place at the cache itself. The simplified representation allows the prefetch tag table to be relatively smaller than the tag array of the cache, and to be accessed relatively quickly. This ensures that the prefetch hit predictor has a small impact on the energy efficiency and area of the processor.

In some embodiments, each prefetch request that is predicted to be a prefetch hit is discarded from a pending prefetch queue, so that the predicted prefetch hits are not provided to the cache controller. If the prefetch prediction module is sufficiently accurate, the discarding of the predicted prefetch hits can reduce power consumption at the processor (because the predicted prefetch hits are not processed at the cache controller) without significantly impacting processor performance.

For purposes of illustration, caches and memory are described herein as storing data. Data, as used herein, can refer either to instructions that are executed by an instruction pipeline of a processor, or to information that is an operand of an instruction being executed at the instruction pipeline.

Figure 1:
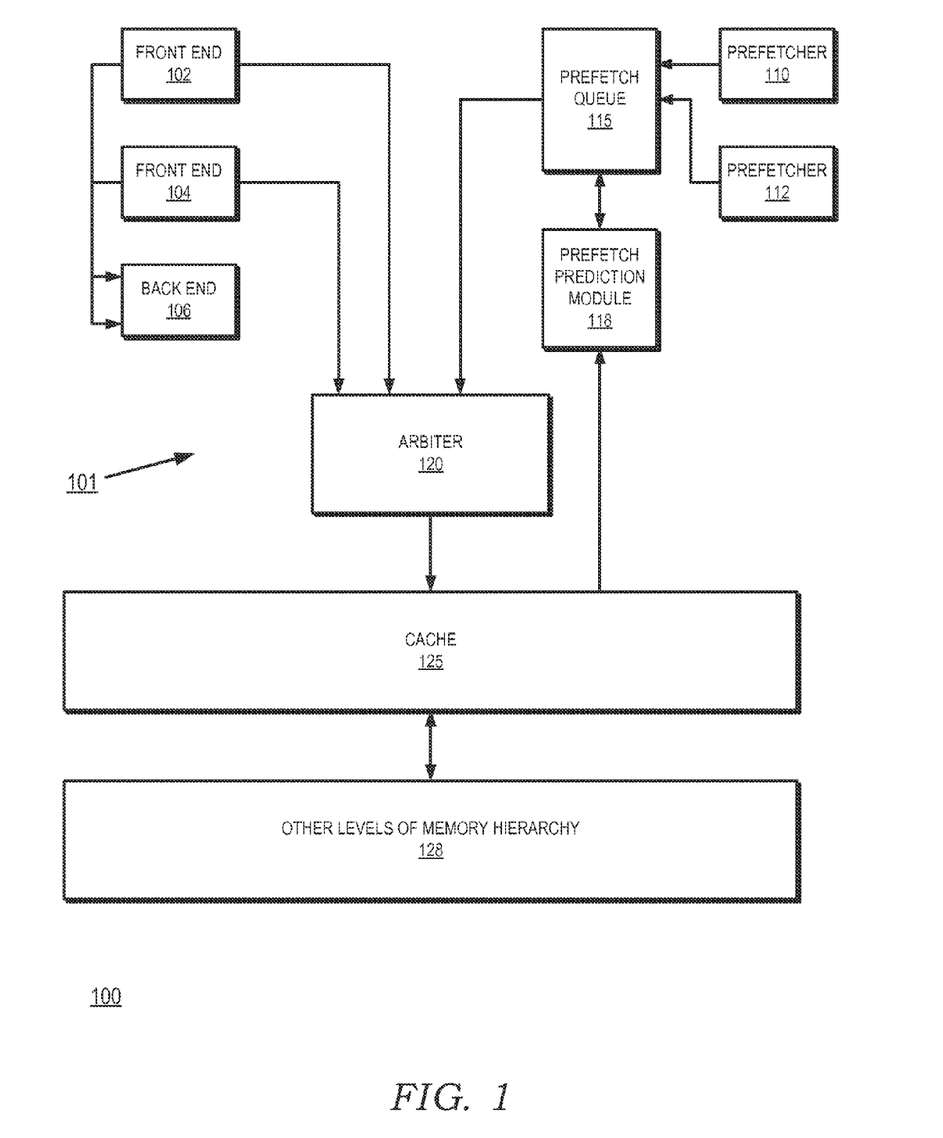
FIG. 1 is a block diagram of a processing system in accordance with some embodiments.

FIG. 1 illustrates a processing system 100 having a cache 125. The processing system 100 can be used in any of a variety of electronic devices, such as a personal computer, tablet, server, portable electronic device such as a cellular phone or smartphone, a game system, set-top box, and the like. The processing system 100 generally stores and executes instructions organized as computer programs in order to carry out tasks defined by the computer programs, such as data processing, communication with other electronic devices via a network, multimedia playback and recording, execution of computer applications, and the like.

The processing system 100 includes a processor 101 having an instruction pipeline front end 102, an instruction pipeline front end 104, a back end 106, prefetchers 110 and 112, a prefetch queue 115, a prefetch prediction module 118, an arbiter 120, and the cache 125. The processing system also includes other levels of a memory hierarchy 128, which represent additional caches and system memory for the processing system 100, whereby the other levels of the memory hierarchy 128 can include both caches internal to the processor 101 and external memory. For example, in some embodiments the cache 125 is a level 1 (L1) cache for the processor 101, and the other levels of the memory hierarchy 128 includes one or more level 2 (L2) caches and a level 3 (L3) cache internal to the processor 101, and further includes system memory external to the processor 101. In some embodiments the cache 125 can be a higher level cache, such as an L2 cache.

The processing system 100 includes multiple instruction pipelines, whereby each instruction pipeline includes a different front end and shares the back end 106 to execute instructions. To illustrate, in the example of FIG. 1 the processing system 100 includes an instruction pipeline comprising the front end 102 and the back end 106, and a different instruction pipeline comprising the front end 104 and the back end 106. The front ends 102 and 104 each include a fetch stage to fetch instructions for their respective instruction pipelines and a decode stage to decode the fetched instructions. The back end 106 includes one or more execution units to execute decoded instructions dispatched by the front ends 102 and 104 and a retire stage to retire the decoded instructions after their execution is completed.

In some embodiments, the processing system 100 divides computer programs to be executed into multiple program threads, whereby each program thread represents an independent set of instructions to be executed at an instruction pipeline. To enhance processing efficiency, the processing system 100 assigns each program thread to be executed to a different instruction pipeline, so that the front ends 102 and 104 concurrently process different program threads.

In the course of executing their respective assigned program threads, the front ends 102 and 104 generate demand requests for data. For example, the fetch stages of each of the front ends 102 and 104 generate demand requests for sets of instructions to be executed for their respective threads. In addition, in order to enhance processing efficiency, the processing system 100 engages in speculative operations to predict what data stored in the memory hierarchy is likely to be needed for each program thread and attempts to move such data in the memory hierarchy so that it is more quickly available to the respective program thread. To perform speculative operations, the prefetchers 110 and 112 each analyze the patterns of demand requests generated by the front ends 102 and 104 and, based on these patterns, generate prefetch requests. In some embodiments, each of the prefetchers 110 and 112 is assigned to a different one of the front ends 102 and 104, and generates prefetch requests for the front end to which they are assigned. Thus, for example, a memory access pattern can indicate that a demand request for data at a given memory address is frequently followed by a demand request for data at another memory address. Accordingly, in response to detecting a demand request for the data at the given memory address, one of the prefetchers 110 and 112 will generate a prefetch request for the data at another memory address and store the prefetch request in the prefetch queue 115. As described further herein, the prefetch request increases the likelihood that the data at another memory address is moved up the memory hierarchy of the processing system 100, so that when a demand request for the data is issued it can be more quickly satisfied.

The cache 125 is configured to respond to a received memory access request by first checking as to whether it stores the data targeted by the memory access request. If it does, it provides the data to the front end 102, 104 that generated the request (if the memory access request is a demand request) or discards the request (if the memory access request is a prefetch request). If it does not store the data, it requests the data from the other levels of the memory hierarchy 128. Once it receives the data, it stores the data for subsequent access and, if the memory access request is a demand request, provides it to the front end that generated the request. The data delivery may occur in parallel with the storing of the data in the cache 125. Thus, the effect of a demand request is that 1) the requested data is moved to the cache 125 for subsequent access; and 2) the data is provided to the front-end that generated the request. The effect of a prefetch request is that the targeted data, if not already present in the cache 125, is moved to the cache 125 for subsequent access by a demand request. The prefetch request thereby lowers the latency of a subsequent demand request targeting the same data.

In some scenarios, the front ends 102 and 104 and prefetchers 110 and 112 can generate concurrent demand and prefetch requests for provision to the cache 125. However, the cache 125 has a limited number of access ports, such that it cannot concurrently service all of the concurrently generated demand and prefetch requests. For example, in the example of FIG. 1 the cache 125 is configured such that it has a single access port, so that it can only service a single memory access request at a time. Accordingly, the processing system 100 employs an arbiter 120 that arbitrates which of the pending memory access requests generated by the front ends 102 and 104 and prefetchers 110 and 112 is selected for provision to the cache 125 for a given access cycle. To illustrate, the processing system 100 includes a prefetch queue 115 to store prefetch requests generated by the prefetchers 110 and 112, and to remove a stored prefetch request once it has been processed at the cache 125. For each access cycle of the cache 125, the arbiter 120 analyzes the prefetch requests stored at the prefetch queue 115 and any demand requests provided by the front ends 102 and 104. According to a defined arbitration policy, the arbiter 120 selects one of these memory access requests for provision to the cache 125. Upon receiving an indication from the cache 125 that the selected memory access request has been processed at the cache 125, the arbiter 120 initiates a new access cycle by selecting another one of the pending memory access requests for provision to the cache 125. The arbiter 120 thus governs which of the pending memory access requests is processed at the cache 125 each access cycle.

Conventionally, the arbiter 120 selects the memory access request according to a thread-by-thread, round robin scheme, such that each executing program thread receives an equal priority for selection and an equal number of access cycles. Thus, if there are two pending threads, designated Thread A and Thread B, the arbiter 120 would alternate selection of memory access requests for Thread A and Thread B. However, such a fixed scheme can lead to processing inefficiencies. If, for example, it is Thread B's turn to be selected by the arbiter 120, but Thread B has a pending prefetch request targeting data that is already present in the cache 125 and Thread A has a demand request, the prefetch request for Thread B will nevertheless be selected for the next access cycle, even though processing of the prefetch request will not improve processing efficiency. Accordingly, the demand request for Thread A will have to wait at least one access cycle for processing, thereby reducing the efficiency for Thread A, without providing a commensurate increase in the processing efficiency for Thread B.

To reduce such processing inefficiencies, the processing system 100 employs a prefetch prediction module 118 to predict which of the prefetch requests stored at the prefetch queue 115 are likely to be prefetch hits (i.e. which of the prefetch requests are predicted to target data that is stored at the cache 125) and to reduce the arbitration priority of those prefetch requests relative to demand requests and relative to prefetch requests predicted to be prefetch misses. In some embodiments, to support prediction of prefetch hit requests, the prefetch prediction module 118 includes a table or other data structure that records tag information indicating the memory addresses of data stored at the cache 125. For each of the prefetch requests stored at the prefetch queue 115, the prefetch prediction module 118 determines a corresponding tag value based on the memory address for the corresponding prefetch request and compares the tag value to the tag information stored at the table. In response to a tag value matching a stored tag, the prefetch prediction module 118 identifies the corresponding prefetch request as a predicted prefetch hit and reduces the priority for the prefetch request. In some embodiments, the prefetch prediction module 118 reduces the priority for the prefetch request by sending a control signal so that the prefetch request is discarded from the prefetch queue 115, so that it is never provided to the arbiter 120, and therefore never provided to the cache 125. In some embodiments, the prefetch prediction module 118 reduces the priority for a predicted prefetch hit by storing an identifier with the corresponding prefetch request at the prefetch queue 115. When the arbiter 120 analyzes the prefetch requests at the prefetch queue 115, it identifies the prefetch requests indicated as being predicted prefetch hits and does not select those prefetch requests for provision to the cache 125 when there are pending demand requests or when there are pending prefetch requests that are predicted to be prefetch misses. In some embodiments, the prefetch prediction module 118 can also increase the priority of a predicted prefetch miss over time, so that the priority of the prefetch miss only remains lower than the priority for other memory access requests for a defined or programmable period of time.

Figure 2:
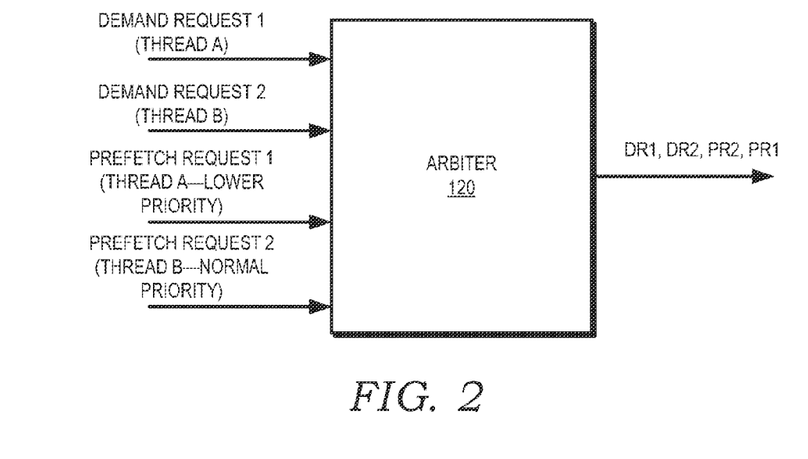
FIG. 2 is a diagram illustrating arbitration of a set of memory access requests at the processing system of FIG. 1 in accordance with some embodiments.

FIG. 2 illustrates an example operation of the arbiter 120 in accordance with some embodiments where a prefetch request has been predicted to be a prefetch hit. In the illustrated example, there are two demand requests pending at the arbiter 120: a demand request (identified as Demand Request 1) for Thread A generated at the front end 102 (FIG. 1) and a demand request for Thread B (identified as Demand Request 2) generated at the front end 104 (FIG. 1). In addition, there are two prefetch requests pending at the prefetch queue 115, identified as Prefetch Request 1 (generated for Thread A) and Prefetch Request 2 (generated for Thread B). Prefetch Request 1 has been identified as a predicted prefetch hit by the prefetch prediction module 118, and its priority has therefore been lowered relative to the other pending memory access requests. In addition, the example of FIG. 2 assumes that no intervening requests are provided to the arbiter 120 while the illustrated memory access requests are processed.

In the example of FIG. 2, the arbiter 120 is generally configured to select pending memory access requests in a round-robin fashion on a thread-by-thread basis. Thus, in the absence of the prefetch prediction module 118 lowering the priority of Prefetch Request 1, the arbiter 120 would select the pending memory access requests in the following sequence: Demand Request 1, Demand Request 2, Prefetch Request 1, Prefetch Request 2. Thus, Prefetch Request 2 would await processing of Prefetch Request 1 at the cache 125 before it is processed, lowering the processing efficiency for Thread B. Further, the processing efficiency for Thread A would not be commensurately increased, because the data for Prefetch Request 1 is likely already present in the cache 125.

However, because the priority of Prefetch Request 1 has been lowered relative to the other pending memory access requests, the arbiter 120 actually selects the memory access requests in the following sequence: Demand Request 1, Demand Request 2, Prefetch Request 2, Prefetch Request 1. Thus, Prefetch Request 2 does not have to await processing of Prefetch Request 1 at the cache 125, thereby potentially increasing the processing efficiency for Thread B. Further, the processing efficiency for Thread A is likely not decreased, because the data for Prefetch Request 1 is likely already present in the cache 125, such that delaying processing of Prefetch Request 1 does not delay moving the target data for Prefetch Request 1 to the cache 125. Accordingly, lowering the priority of Prefetch Request 1 in response to predicting it is a prefetch hit increases the processing efficiency at the processing system 100 overall.

Figure 3:
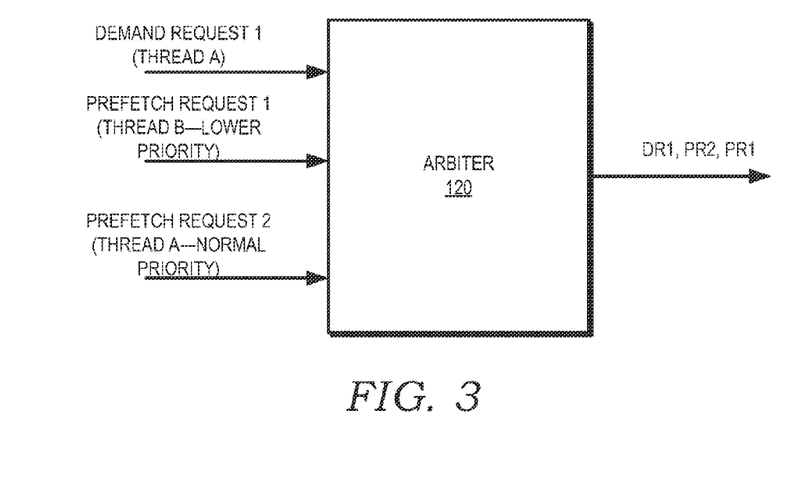
FIG. 3 is a diagram illustrating arbitration of another set of memory access requests at the processing system of FIG. 1 in accordance with some embodiments.

FIG. 3 illustrates another example operation of the arbiter 120 in accordance with some embodiments where a prefetch request has been predicted to be a prefetch hit. In the illustrated example, there is demand request pending at the arbiter 120: a demand request (identified as Demand Request 1) for Thread A generated at the front end 102 (FIG. 1). In addition, there are two prefetch requests pending at the prefetch queue 115, identified as Prefetch Request 1 (generated for Thread B) and Prefetch Request 2 (generated for Thread A). Prefetch Request 1 has been identified as a predicted prefetch hit by the prefetch prediction module 118, and its priority has therefore been lowered relative to the other pending memory access requests.

In the example of FIG. 3, the arbiter 120 is generally configured to select pending memory access requests in a round-robin fashion on a thread-by-thread basis. Thus, in the absence of the prefetch prediction module 118 lowering the priority of Prefetch Request 1, the arbiter 120 would select the pending memory access requests in the following sequence: Demand Request 1, Prefetch Request 1, Prefetch Request 2. Thus, Prefetch Request 2 would await processing of Prefetch Request 1 at the cache 125 before it is processed, thereby lowering the processing efficiency for Thread A. Further, the processing efficiency for Thread B would likely not be commensurately increased, because the data for Prefetch Request 1 is likely already present in the cache 125.

However, because the priority of Prefetch Request 1 has been lowered relative to the other pending memory access requests, the arbiter 120 actually selects the memory access requests in the following sequence: Demand Request 1, Prefetch Request 2, Prefetch Request 1. Thus, Prefetch Request 2 does await processing of Prefetch Request 1 at the cache 125, thereby potentially increasing the processing efficiency of Thread A. Further, the processing efficiency for Thread B is not decreased, because the data for Prefetch Request 1 is likely already present in the cache 125, such that delaying processing of Prefetch Request 1 does not delay moving the target data for Prefetch Request 1 to the cache 125. Accordingly, lowering the priority of Prefetch Request 1 in response to predicting it is a prefetch hit increases the processing efficiency at the processing system 100 overall.

Figure 4:
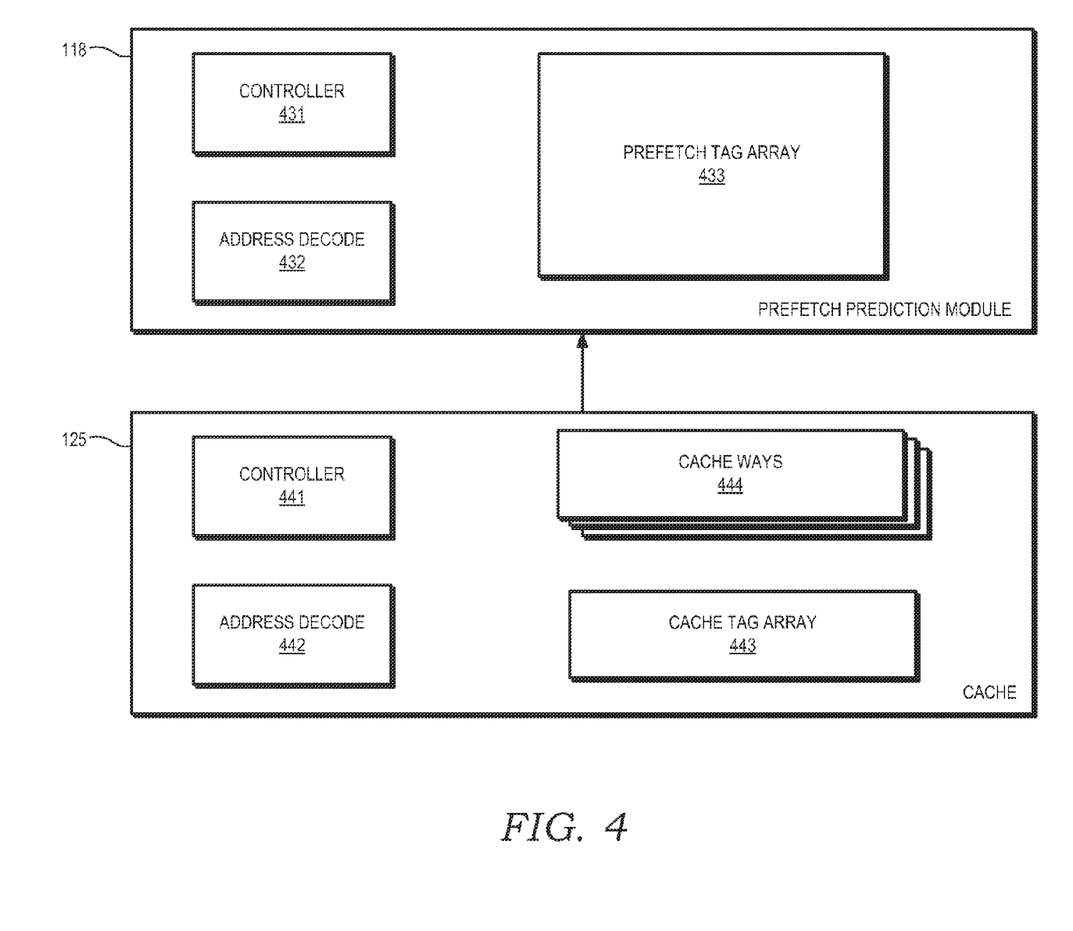
FIG. 4 is a block diagram of a cache and prefetch prediction module of the processing system of FIG. 1 in accordance with some embodiments.

FIG. 4 illustrates a block diagram showing additional details of the prefetch prediction module 118 and the cache 125 in accordance with some embodiments. The prefetch prediction module 118 includes a controller 431, an address decode module 432, and a prefetch tag array 433. The cache 125 includes a cache controller 441, an address decode module 442, a cache tag array 443, and cache ways 444.

The cache ways 444 are a collection of storage elements to store data, as retrieved from the lower levels of the memory hierarchy 128 (FIG. 1) for the cache 125. The cache ways 444 are organized into an N-way set associative structure. In particular, the cache ways 444 are organized into M sets, with each set including N of the cache ways 444. Each set of the cache 125 is associated with a different range of memory addresses, identified by a corresponding value referred to as an index, where the index is derivable from a portion of the memory addresses. Each way in a set can store data corresponding to any memory address in the range identified by the set's index. The particular data stored at a way is identified by a tag value that is derivable from the memory address.

The cache tag array 443 stores the tag values for the data stored at the cache ways 444. The address decode module 442 decodes received memory addresses to identify the index and tag value associated with each memory address. In particular, the address decode module 442 performs a transformation, referred to as a hash, using different subsets of memory address bits to identify the index and tag values.

The cache controller 441 controls the transfer of data to and from the cache ways 444. In operation, the cache controller 441 receives a memory access request from the arbiter 120 (FIG. 1). In response, the cache controller 441 commands the address decode module 442 to identify the index and tag value for the memory address. The cache tag array 443 compares the identified tag value to its stored tag values. In response to the cache tag array 443 determining a match with the identified tag value (a cache hit), the cache controller 441 satisfies the memory access request, as follows: 1) if the memory access request is a demand write request, the cache controller 441 writes received data to the one of the cache ways 444 indicated by the index and the tag value for the received memory address (the identified cache way); 2) if the memory access request is a demand read request, the cache controller 441 retrieves the data stored at the identified cache way; and 3) if the memory access request is a prefetch request, the cache controller 441 takes no action with respect to storing or retrieving data from the identified cache way, as the data is already available for a subsequent demand request.

In response to the cache tag array 443 determining that it does not store the identified tag value derived from the memory address (a cache miss), the cache controller 441 requests the data associated with the memory address from the lower levels of the memory hierarchy 128. In response to receiving the data, the cache controller 441 stores the data at one of the ways of the set identified by the index value derived from the memory address, and stores the tag value derived from the memory address at the cache tag array 443. The cache controller 441 also satisfies the memory access request as explained above. In addition, the cache controller 441 indicates the tag value for the memory address to the prefetch prediction module 118, so that it can remain up to date on the data stored at the cache 125.

The prefetch tag array 433 of the prefetch prediction module 118 stores tag values for data stored at the cache 125. In some embodiments, the prefetch tag array 433 is configured to represent an N-way set associative structure having the same size as the N-way set associative structure of the cache ways 444, including the same number of sets. In such scenarios, the tag values stored at the prefetch tag array 433 are the same as the tag values stored at the cache tag array 443. In some embodiments, so that it can be more quickly accessed, the prefetch tag array 433 is configured to represent a smaller structure than the cache ways 444. For example, the prefetch tag array 433 can be configured to represent an N-way set associative structure, but with fewer sets than the cache 125. The prefetch tag array 433 can be configured to represent an L-way set associative structure, where L is less than N, so that the prefetch tag array 433 represents the same number of sets as the cache 125 but having fewer ways per set. The prefetch tag array 433 can also be configured to represent fewer sets than are at the cache 125, with each set having fewer ways than the ways per set at the cache 125.

In cases where the prefetch tag array 433 represents a smaller structure than the cache ways 444, the tag values stored at the prefetch tag array 433, and the index values that indicate where the tag values are stored at the prefetch array 433, can be smaller than the tag values and index values used to access the cache ways 444. For example, the cache ways 444 can be organized into 256 sets with the ways in the set identified by 20 bit tags, while the prefetch tag array 433 represents 256 sets using 3 bit tags. As another example, the cache ways 444 can be organized into 256 sets with the ways in the set identified by 20 bit tags, while the prefetch tag array 433 represents 64 sets using 3 bit tags. The use of smaller tag values and smaller number of sets provides for quicker searching of the prefetch tag array 433 relative to the cache tag array 443, allowing for prefetch hit predictions to be made more quickly so as not to unduly impact throughput of the prefetch requests.

In such cases where the prefetch tag array 433 represents a smaller structure than the cache ways 444, the tags stored at the prefetch tag array 433 may not perfectly represent the tags of the data stored at the cache ways 144. For example, a particular location of the prefetch tag array 433 can correspond to multiple locations in different sets of the cache ways 444. In such a scenario, the location of the prefetch tag array 443 will only correctly indicate the memory address of the data stored at one of the multiple locations, such that prefetch requests having memory addresses corresponding to others of the multiple locations will be mispredicted as prefetch misses. While this can reduce the efficiency enhancement resulting from the prefetch prediction module 118, it reduces the chance that a prefetch miss will be predicted as a prefetch hit, so that the efficiency resulting from prefetching is not unduly impacted.

The address decode module 432 decodes received addresses to identify a tag value and index value indicating a location of the prefetch tag array 433. The controller 431 employs the address decode module 432 and the prefetch tag array 433 to determine whether prefetch requests stored at the prefetch queue 115 (FIG. 1) are predicted to be prefetch hits or prefetch misses. To illustrate, in operation the controller 431 receives information from the cache 125 indicating the memory address for data stored at the cache ways 444. In response, the controller 431 commands the address decode module 432 to determine a tag value and index value for the memory address. In cases where the prefetch tag array 433 is configured to represent a structure of the same size as the cache ways 444, the address decode module 432 can use the same or similar hash as the address decode module 442 of the cache 125 to determine the tag value and index value. In cases where the prefetch tag array is configured to represent a structure of the same size as the cache ways 444, the address decode module 432 can use a different hash that can be implemented more quickly than the hash used by the address decode module 442. The controller 431 stores the tag value at a location of the prefetch tag array 433 indicated by the tag value and index value.

In response to determining a new prefetch request has been stored at the prefetch queue 115, the controller 431 commands the address decode module 432 to determine a tag value and an index value for the memory address associated with the prefetch request. The prefetch tag array 433 uses this information to determine if it stores the tag value corresponding to the memory address. If the prefetch tag array 433 does store the tag value, the controller 431 determines that the prefetch request is predicted to be a prefetch hit. In response, the controller 431 lowers the priority of the prefetch request, either by instructing the prefetch queue 115 to discard the prefetch request, by setting a low priority flag associated with the prefetch request, by changing a priority value associated with the prefetch request, and the like.

Figure 5:
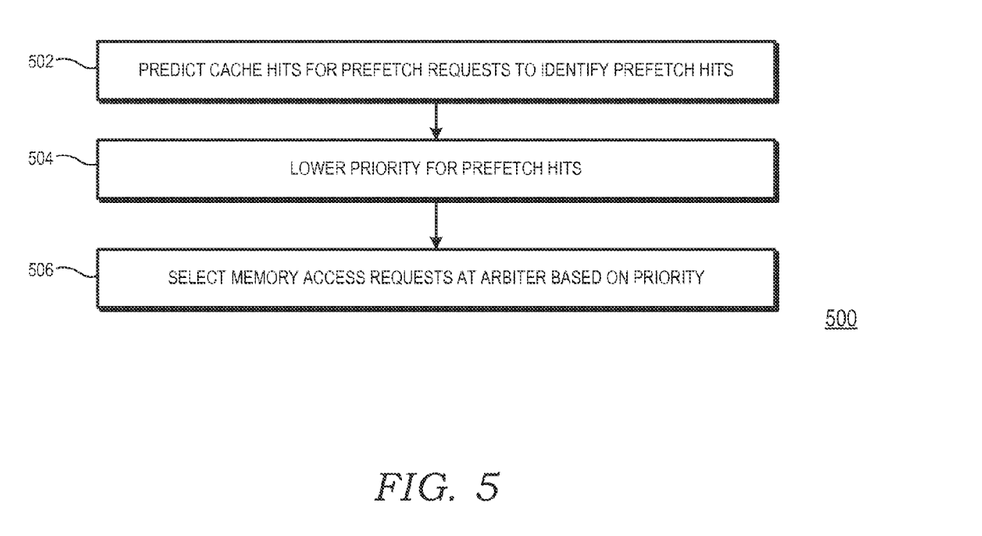
FIG. 5 is a flow diagram illustrating a method of arbitrating memory access requests at a processing system in accordance with some embodiments.

FIG. 5 illustrates a block diagram of a method 500 of arbitrating memory access requests in accordance with some embodiments of the present disclosure. For purposes of explanation, the method 500 is described with respect to an example implementation at the processing system 100 of FIG. 1. At block 502, the prefetch prediction module 118 predicts which of the prefetch requests stored at the prefetch queue 115 are prefetch hits by predicting which of those prefetch requests will result in a cache hit at the cache 125. At block 504 the prefetch prediction module 118 lowers the priority of those prefetch requests predicted to be prefetch hits. At block 506 the arbiter 120 arbitrates pending memory access requests based on the priority for each request, so that demand requests and predicted prefetch misses are provided to the cache 125 before predicted prefetch hits.

In some embodiments, the apparatus and techniques described above are implemented in a system comprising one or more integrated circuit (IC) devices (also referred to as integrated circuit packages or microchips), such as the processing system described above with reference to FIGS. 1-5. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 6:
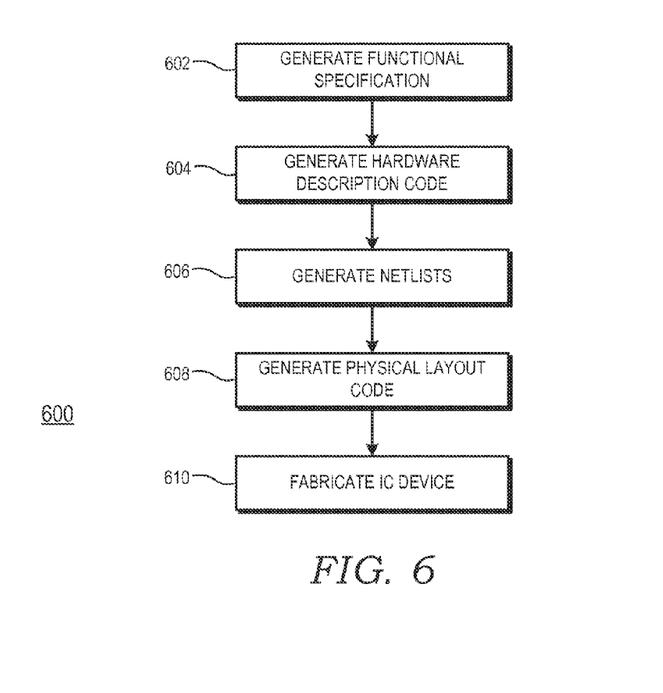
FIG. 6 is a flow diagram illustrating a method for designing and fabricating an integrated circuit device implementing at least a portion of a component of a processing system in accordance with some embodiments.

FIG. 6 is a flow diagram illustrating an example method 900 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB.

At block 604, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 606 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored on a computer readable medium that, when executed by the one or more processors, manipulate the one or more processors to perform one or more aspects of the techniques described above. The software is stored or otherwise tangibly embodied on a computer readable storage medium accessible to the processing system, and can include the instructions and certain data utilized during the execution of the instructions to perform the corresponding aspects.

As disclosed herein, in some embodiments a method includes setting a first arbitration priority for a first prefetch request in response to a prediction that the first prefetch request targets data stored in a cache; and selecting, based on the first arbitration priority, between the first prefetch request and one or more memory access requests for provision to the cache. In some aspects the one or more memory access requests includes a demand request having a second arbitration priority higher than the first arbitration priority; and the selecting includes selecting the demand request over the first prefetch request for provision to the cache based on the first arbitration priority and the second arbitration priority. In some aspects, the method further includes setting a second arbitration priority for a second prefetch request in response to a prediction that the second prefetch request targets data not stored in the cache, the second arbitration priority having a higher priority than the first arbitration priority; wherein the selecting includes selecting the second prefetch request over the first prefetch request for provision to the cache based on the first arbitration priority and the second arbitration priority. In some aspects the method includes discarding the first prefetch request so that the first prefetch request is not provided to the cache in response to the prediction that the first prefetch request targets data stored in the cache. In some aspects, selecting includes selecting the first prefetch request for provision to the cache in response to the first arbitration priority being greater than arbitration priorities for the one or more memory access requests. In some aspects the method includes adjusting the first arbitration priority based on an amount of time that the first prefetch request has been pending for provision to the cache. In some aspects, the method includes predicting whether the first prefetch request targets data stored in the cache, wherein predicting includes: calculating a first tag value using a first subset of bits of an address targeted by the first prefetch request, the first subset of bits being different from a second subset of bits of the address employed by the cache to calculate a second tag value for the first prefetch request; and predicting whether the first prefetch request targets data stored in the cache based on the first tag value. In some aspects calculating the first tag value includes: calculating the first tag value according to a first hash function different from a second hash function used to calculate the second tag value. In some aspects predicting further includes: accessing a table using the first tag value, the table storing a plurality of tag values indicative of addresses for data stored at the cache; and predicting that the first prefetch request targets data stored in the cache in response to determining the first tag value is stored at the table. In some aspects, the table and the cache are set-associative structures, the table having a smaller number of sets than the cache.

In some embodiments, a method includes discarding a first prefetch request at a processor in response to a prediction that the first prefetch request is targeted to data stored at a cache so that the first prefetch request is not presented to the cache. In some aspects the method further includes satisfying a second prefetch request at the memory hierarchy of the processor in response to a prediction that the second prefetch request is not targeted to data stored at the cache. In some aspects, discarding includes: removing the first prefetch request from a queue that stores a plurality of prefetch requests pending for provision to the memory hierarchy of the processor.

In some embodiments, a processor includes a cache; a first prefetcher to generate a first prefetch request targeting first data; a prefetch prediction module to set a first arbitration priority for the first prefetch request based on a prediction as to whether the first data is stored at the cache; and an arbiter to select between the first prefetch request and a plurality of memory access requests for provision to the cache based on the first arbitration priority. In some aspects, the processor includes an instruction pipeline to provide to the arbiter a demand request having a second arbitration priority higher than the first arbitration priority; and wherein the arbiter is to select the demand request over the first prefetch request for provision to the cache based on the first arbitration priority and the second arbitration priority. In some aspects, the processor includes: a second prefetcher to generate a second prefetch request targeting second data; and wherein the prefetch prediction module is to set a second arbitration priority for the second prefetch request in response to a prediction that the second prefetch request targets data not stored in the cache, the second arbitration priority having a higher priority than the first arbitration priority. In some aspects, the prefetch prediction module is to discard the first prefetch request so that the first prefetch request is not provided to the cache in response to the prediction that the first prefetch request targets data stored in the cache. In some aspects, the arbiter is to select the first prefetch request for provision to the cache in response to the first arbitration priority being greater than arbitration priorities for the plurality of memory access requests. In some aspects, the prefetch prediction module includes: an address decoder to calculate a first tag value using a first subset of bits of an address targeted by the first prefetch request, the first subset of bits being different from a second subset of bits of the address employed by the cache to calculate a second tag value for the first prefetch request. In some aspects, the prefetch prediction module includes a set-associative structure.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
setting a first arbitration priority for a first prefetch request in response to a prediction that the first prefetch request targets data stored in a cache; and
selecting, based on the first arbitration priority, between the first prefetch request and one or more memory access requests for provision to the cache.

2. The method of claim 1, wherein:
the one or more memory access requests comprises a demand request having a second arbitration priority higher than the first arbitration priority; and
the selecting comprises selecting the demand request over the first prefetch request for provision to the cache based on the first arbitration priority and the second arbitration priority.

3. The method of claim 1, further comprising:
setting a second arbitration priority for a second prefetch request in response to a prediction that the second prefetch request targets data not stored in the cache, the second arbitration priority having a higher priority than the first arbitration priority;
wherein the selecting comprises selecting the second prefetch request over the first prefetch request for provision to the cache based on the first arbitration priority and the second arbitration priority.

4. The method of claim 1, further comprising:
discarding the first prefetch request so that the first prefetch request is not provided to the cache in response to the prediction that the first prefetch request targets data stored in the cache.

5. The method of claim 1, wherein selecting comprises selecting the first prefetch request for provision to the cache in response to the first arbitration priority being greater than arbitration priorities for the one or more memory access requests.

6. The method of claim 1, further comprising:
adjusting the first arbitration priority based on an amount of time that the first prefetch request has been pending for provision to the cache.

7. The method of claim 1, further comprising:
predicting whether the first prefetch request targets data stored in the cache, wherein predicting comprises:
calculating a first tag value using a first subset of bits of an address targeted by the first prefetch request, the first subset of bits being different from a second subset of bits of the address employed by the cache to calculate a second tag value for the first prefetch request; and
predicting whether the first prefetch request targets data stored in the cache based on the first tag value.

8. The method of claim 7, wherein calculating the first tag value comprises:
calculating the first tag value according to a first hash function different from a second hash function used to calculate the second tag value.

9. The method of claim 7, wherein predicting further comprises:
accessing a table using the first tag value, the table storing a plurality of tag values indicative of addresses for data stored at the cache; and
predicting that the first prefetch request targets data stored in the cache in response to determining the first tag value is stored at the table.

10. The method of claim 9, wherein:
the table and the cache are set-associative structures, the table having a smaller number of sets than the cache.

11. A method, comprising:
discarding a first prefetch request at a processor in response to a prediction that the first prefetch request is targeted to data stored at a cache so that the first prefetch request is not presented to the cache.

12. The method of claim 11, further comprising:
satisfying a second prefetch request at a memory hierarchy of the processor in response to a prediction that the second prefetch request is not targeted to data stored at the cache.

13. The method of claim 11, wherein the discarding comprises:
removing the first prefetch request from a queue that stores a plurality of prefetch requests pending for provision to a memory hierarchy of the processor.

14. A processor, comprising:
a cache;
a first prefetcher to generate a first prefetch request targeting first data;
a prefetch prediction module to set a first arbitration priority for the first prefetch request based on a prediction as to whether the first data is stored at the cache; and
an arbiter to select between the first prefetch request and a plurality of memory access requests for provision to the cache based on the first arbitration priority.

15. The processor of claim 14, further comprising:
an instruction pipeline to provide to the arbiter a demand request having a second arbitration priority higher than the first arbitration priority; and
wherein the arbiter is to select the demand request over the first prefetch request for provision to the cache based on the first arbitration priority and the second arbitration priority.

16. The processor of claim 14, further comprising:
a second prefetcher to generate a second prefetch request targeting second data; and
wherein the prefetch prediction module is to set a second arbitration priority for the second prefetch request in response to a prediction that the second prefetch request targets data not stored in the cache, the second arbitration priority having a higher priority than the first arbitration priority.

17. The processor of claim 14, wherein the prefetch prediction module is to discard the first prefetch request so that the first prefetch request is not provided to the cache in response to the prediction that the first prefetch request targets data stored in the cache.

18. The processor of claim 14, wherein the arbiter is to select the first prefetch request for provision to the cache in response to the first arbitration priority being greater than arbitration priorities for the plurality of memory access requests.

19. The processor of claim 14, wherein the prefetch prediction module comprises:
an address decoder to calculate a first tag value using a first subset of bits of an address targeted by the first prefetch request, the first subset of bits being different from a second subset of bits of the address employed by the cache to calculate a second tag value for the first prefetch request.

20. The processor of claim 14, wherein the prefetch prediction module comprises a set-associative structure.

* * * * *